Figure 1:
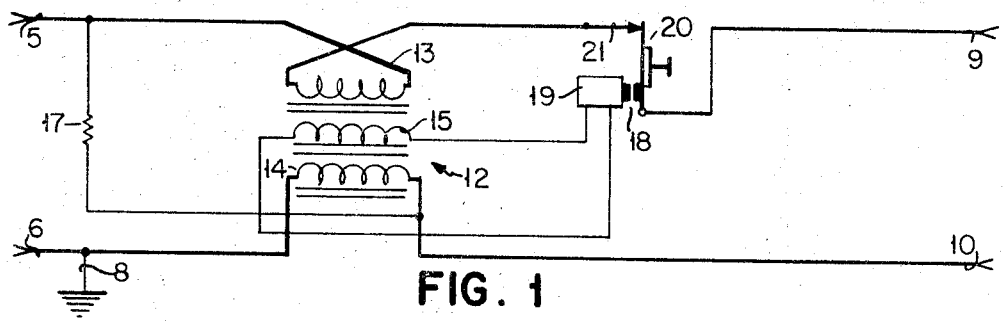

United States Patent

[11] 3,558,980

| [72] | Inventors | Douglas A. Florance<br>Vestal;<br>Lloyd P. Nordholm; Stephen Foldes,<br>Binghamton, N.Y. |
|---|---|---|
| [21] | Appl. No. | 828,836 |
| [22] | Filed | May 29, 1969 |
| [45] | Patented | Jan. 26, 1971 |
| [73] | Assignee | Flo-Root, Inc.<br>Endicott, N.Y.<br>a corporation of New York |

[54] AUTOMATIC GROUND FAULT CIRCUIT INTERRUPTER
9 Claims, 2 Drawing Figs.

[52] U.S. Cl. .................................................. 317/18,
317/27, 317/33, 336/173
[51] Int. Cl. ........................................................ H02h 3/28,
H02h 7/26
[50] Field of Search ........................................ 317/17, 18,
27, 33; 336/173

[56] References Cited
UNITED STATES PATENTS

| 3,252,052 | 5/1966 | Nash ........................ | 317/18 |
| 3,296,493 | 1/1967 | Whittaker et al. ............ | 317/18 |
| 3,376,477 | 4/1968 | Weinger ...................... | 317/27 |

*Primary Examiner*—James D. Trammell
*Attorney*—Frederick E. Bartholy

ABSTRACT: A power distribution system with automatic protection of ground fault is described. In series with both conductors of a power line are primary windings of a transformer connected in opposite phase relation. A secondary winding is energized by virtue of a predetermined reference current through one of the primary windings. A control circuit or the holding coil of a circuit breaker is energized from the secondary winding. The induced electromotive force due to reference current is canceled by ground fault leakage current which must flow through the out-of-phase primary winding effecting disconnection of the live conductor.

PATENTED JAN 26 1971      3,558,980

INVENTORS
DOUGLAS A. FLORANCE
LLOYD D. NORDHOLM
STEPHEN FOLDES

BY *Frederick E. Bartholy*

ATTORNEY

AUTOMATIC GROUND FAULT CIRCUIT INTERRUPTER

This invention relates to power distribution systems and, more particularly, to protection of feeder lines against ground faults.

For the safety of electrical installations, it is mandatory that a ground return circuit be provided so that apparatus having conductive casings may be effectively placed at ground potential. Serious electrical shocks may occur if the body of a person handling electrical appliances completes the circuit to ground, in case the device has a poor ground connection and it is in contact with the live wire or hot line of the electrical system.

A defect in a grounded device which permits current flow from the hot line through the metallic housing thereof may be of such relatively high resistance as to act as an additional load without causing overload protective devices, such as fuses or circuit breakers, to function. Such high resistance ground faults are particularly dangerous in that after a given time the power dissipated therein may cause sufficient heat to result in a fire.

Various devices and circuits for the detection and elimination of ground faults have been proposed—some sensing the effective impedance of the system ground and others operating on an imbalance which ground fault currents may produce. The disadvantage of such detectors lies in the sensitivity required for the detection of small currents which makes them unstable at times, causing fault indications even under normal operating conditions. A reactance coil connected between the system neutral and ground, so proportioned to the system capacitance that the lagging current through the coil at time of single conductor line-to-ground fault is equal in magnitude and opposite in phase to the charging current at the fault, has also been employed. This is generally known as the "Petersen" coil. However, it cannot clear phase-to-phase faults.

Accordingly, it is a primary object of this invention to provide a simple circuit capable of detecting defective conditions in a system due to current caused by a conductive path between ground and a live wire.

It is a particular feature of the invention that the basic circuit is simple in operation, requiring relatively few component elements and assuring continuous maintenance-free operation.

It is a particular advantage of the invention that the circuit in accordance therewith is capable of detecting currents, above a predetermined value, which bypass the neutral conductor and automatically disconnect the system from the load.

Figure 2:
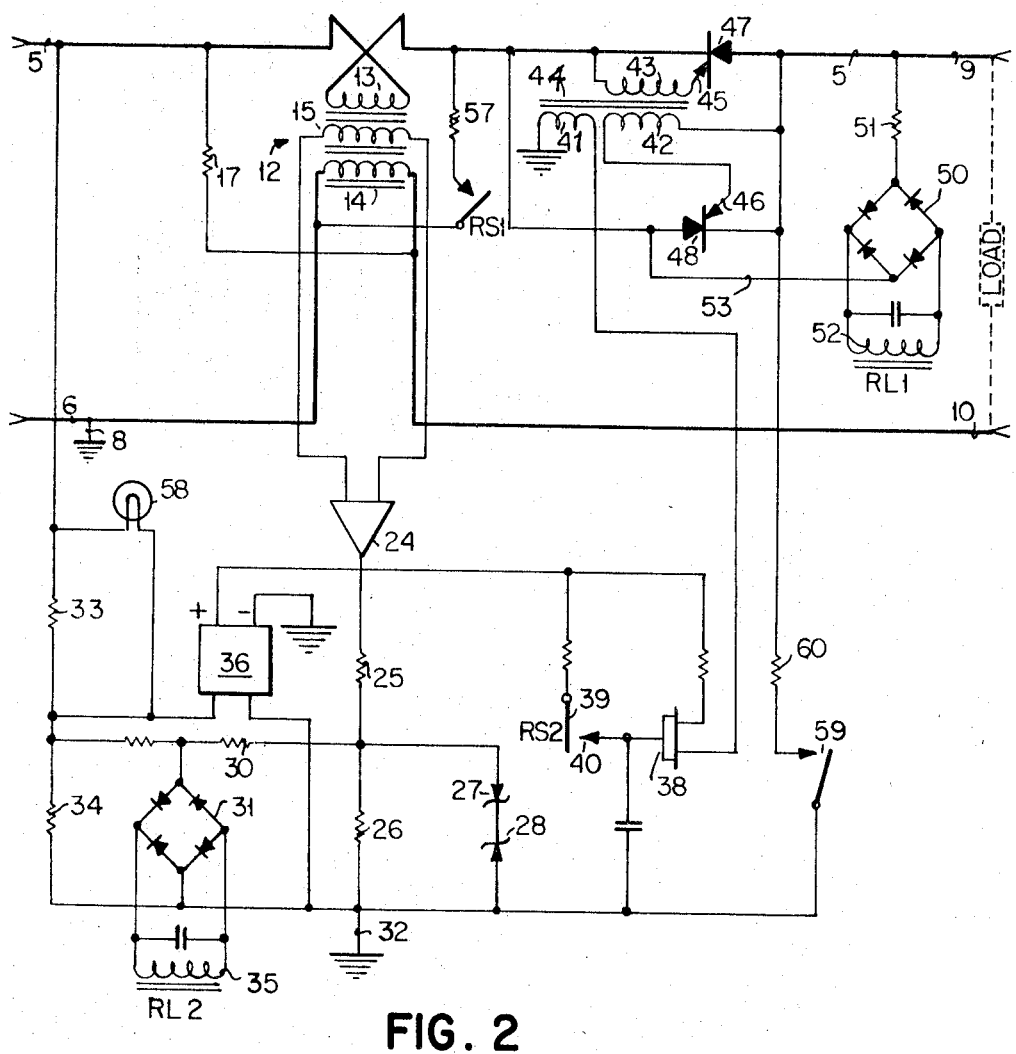

Other objects, features and advantages will be apparent from the following description of the invention, defined in particularity in the appended claims, and taken in connection with the accompanying drawings, in which:

FIG. 1 is a schematic circuit diagram of the basic ground fault detector and circuit protector; and FIG. 2 is a schematic circuit based on the operating principle of that shown in FIG. 1 with modifications including electronic control of the power supply system.

Referring to FIG. 1, the feed line, consisting of conductors 5 and 6, represents the load current carrying conductors of a power distribution system. Of these, conductor 6 is indicated as the neutral conductor, being grounded at the infeed end at 8. Power is delivered at terminals 9 and 10 which represent the delivery end of the system. Transformer 12 is of the type having two primary windings 13 and 14 and a secondary winding 15. The primary winding 13 is connected in series with the conductor 5. Similarly, the secondary winding 14 is connected in series with the neutral conductor 6. It is to be noted that the windings 13 and 14 are so polarized—in other words connected in such a manner—that the currents flowing therethrough, when a load is applied between terminals 9 and 10, are in opposite phase and therefore cancel. Consequently, no voltage is induced in the secondary winding 15 due to the current produced by a load which may be placed between terminals 9 and 10. A fixed impedance 17, generally in the form of a resistance, is connected between conductor 5 and conductor 6 and in series with winding 14. The shunt path provided by resistance 17 produces a predetermined current flow in the winding 14, whereby a voltage is induced in the secondary winding 15. This current is termed the "reference current" inasmuch as the system's response to ground fault is related to this predetermined current magnitude. While current of different values may be chosen for this purpose, it has been found that 5 milliamperes is a suitable value in that it represents a small power consumption—in the neighborhood of slightly over ½watt—in the system and is considered physiologically safe for the human body.

Near the delivery end, a circuit breaker 18, of the type which is manually closed and tripped by a holding coil 19, has its switch contacts 20 and 21 placed in series with the conductor 5. The holding coil 19 is connected in parallel with the winding 15 of the transformer 12. The holding coil 19 has such electrical characteristics that it is energized by the voltage induced in the winding 15 of the transformer 12 by virtue of the reference current flow so that it will hold the tripping element of the circuit breaker in closed position.

Referring to the operation of the above-described basic circuit, it is seen that primary winding 14 of the transformer 12 is constantly energized by virtue of the path provided by resistor 17 and thus produces a voltage in the secondary winding 15 which, energizing the holding coil 19, maintains the circuit breaker 18 in closed position. Thus power between live conductor 5 and the neutral conductor 10 may be had for supplying a load connected to these terminals. The power that the system delivers must of course be between conductors 5 and 6 and the capability of the system depends entirely on the design parameters for which it is intended. Conventional fuses or overload protection breakers have been omitted for the sake of simplicity of illustration. It is of course understood that such protective devices are normally provided in all power distribution systems.

Assuming that some fault in the insulation of equipment supplied from the power line may cause a conductive path between live conductor 5 at terminal 9 and the ground return of the housing, casing or conduits of the equipment, the current so produced, flowing between ground and conductor 5, bypasses the neutral conductor 10. Hence, the winding 13 will have a current in excess of that of winding 14. By virtue of the bucking relation of these windings, such ground fault current—once having reached the magnitude of the reference current—will be sufficient to cancel the induced voltage in the winding 10. The holding coil 19 thus becomes deenergized, allowing the circuit breaker 18 to trip and open contacts 20 and 21, disconnecting the power from terminal 9 of the live wire 5.

As long as the ground fault remains, closing of the circuit breaker 18 cannot be effected without tripping, since holding coil 19 cannot be energized. The above also holds true in case a human body serves as the shunt path to ground. Since the reference current is chosen to be of a physiologically safe magnitude, a person touching the live wire may receive only a mild shock—initiating, however, the tripping of the circuit breaker so that the current is disconnected.

Referring to FIG. 2, similar reference characters indicate identical component elements. Instead of utilizing a mechanical circuit breaker, the secondary winding 15 supplies voltage to a control system. This may comprise an operational amplifier 24 having in its output circuit resistors 25 and 26 in series. The junction point thereof is connected to zener diodes 27 and 28 in series, arranged back-to-back. In this manner, there is developed a control voltage across resistor 26 which serves to supply energy over the resistor 30 to a full wave rectifier module 31. The latter supplies energy to the relay RL2.

A power supply may be provided from live conductor 5 to a ground point 32 by means of resistors 33 and 34 connected in series. The power so derived between ground point 32 and the junction point of resistors 33 and 34 is applied to a conventional rectifier power supply shown here in block diagram as 36. Various conventional types of supplies may be chosen for this purpose, preferably those having regulation to furnish a constant voltage.

The supply 36 furnishes power to an oscillator 38, shown here by way of example as that of a unijunction transistor type which is simple in construction and dependable in operation. Other types of oscillators may of course be used for the purpose intended.

The oscillator 38 is activated upon closure of contacts 39 and 40 of RS2 which is part of, and operated by, the relay RL2. The output of the oscillator 38 is applied to the primary winding 41 of transformer 44 which has secondary windings 42 and 43. The latter connect to the respective gate electrodes 45 and 46 of silicon-controlled rectifiers 47 and 48 which are connected back-to-back and in series with the live conductor 5.

In parallel with the silicon-controlled rectifiers 47 and 48 is connected the rectifier module 50 including a series resistance 51. The module 50 supplies energy to the winding 52 of relay RL1. The contacts RS1 of the latter connect between the ground side of neutral conductor 6 and the live conductor 5 in series with resistor 57.

Referring again to the control circuit, it is seen that a pilot light 58 may be connected across the resistor 33 to indicate that power is being supplied to the control circuit. Moreover, a testing switch 59, in series with resistor 60, is connected from conductor 5 to ground so as to simulate, when closed, a ground fault. This will be further clarified in connection with the description of the operation of the circuit.

Referring to the operation of the circuit shown in FIG. 2, the action of the transformer 12 is similar to the one heretofore described in that, by virtue of the connection of resistor 17, a constant current is flowing in the primary winding 14 which, in turn, induces a voltage across terminals of the secondary winding 15. This voltage is applied to the input of amplifier 24 and appears in the output circuit across resistor 26 at a substantially constant magnitude by the clipping action of the zener diodes 27 and 28. The rectifier module 31 is thus energized over resistor 30, supplying a direct current potential across the winding 35 of relay RL2. This closes contacts 39 and 40 of relay switch RS2 completing the circuit from the power supply 36 to the oscillator 38. The latter, being in operation, energizes the primary winding 41 of transformer 44 at a predetermined frequency in order to assure conduction of the silicon-controlled rectifiers 47 and 48 over the entire half cycles of the power line frequency. The secondary windings 42 and 43 will thereby effect conduction of the silicon-controlled rectifiers at the rate determined by the frequency of the oscillator 38. Line current is thus supplied between terminals 9 and 10.

As long as rectifiers 47 and 48 remain conducting, they effectively short circuit the parallel path across them provided by resistor 51 and conductor 53 which feeds the rectifier module 50. Consequently, no operating current is supplied to the winding 52 of relay RL1.

Assuming that a ground fault occurs, i.e., a current conductive path is established between ground and the live conductor 5 at the delivery end of the system, the current produced by this ground fault circuit must pass through primary winding 13 of the transformer 12 causing an imbalance which cancels the reference voltage across winding 15 of transformer 12. The output voltage of amplifier 24 across resistor 26 thus drops to zero or such low value that winding 35 of relay RL2 becomes deenergized. Contacts 39 and 40 of switch RS2 will therefore open, disabling the function of the oscillator 38. Without switching voltage supplied to the transformer 44, silicon-controlled rectifiers 47 and 48 become nonconducting by virtue of their reverse bias. In this state, current may flow over conductor 53, rectifier module 50, resistor 51, and load to the neutral conductor at 10. Current is thereby supplied to rectifier module 50 which energizes winding 52 of relay RL1 which, in turn, closes contacts of the switch RS1, placing resistor 57 in the circuit between conductor 5 and the grounded terminal of the primary winding 14. The resistor 57 is so proportioned as to be substantially equal in value to that of resistor 17. It is now seen that current may flow in opposite directions through winding 14, so that the inductive effect of this winding as far as the secondary winding 15 is concerned, is nullified. The amplifier 24 remains deenergized and the control system inactive for supplying switching power to the rectifiers from the oscillator 38. Once the relay RL1 closes switch RS1, the power supply circuit remains open—even after the ground fault is removed—until the switch RS1 is either manually reset or input power to the power distributing conductors 5 and 6 is momentarily interrupted, or the load is removed.

For the purpose of testing the operation of the control system, the switch 59 may be closed whereby a conductive path is provided between conductor 5 and the ground return of the circuit. This, in effect, simulates a ground fault. Even a momentary closure of the switch 59 is sufficient inasmuch as the instant the silicon-controlled rectifiers 47 and 48 have no switching current, the relay RL1 becomes energized, closing contacts RS1, which, as explained above, disables power conduction between the outfeed terminals 9 and 10.

While preferred embodiments have been described, it will be apparent that various changes and modifications can be made without departing from the true spirit and scope of the present invention. It is intended that the invention be limited only by the appended claims.

We claim:

1. In a power distribution system including at least two load current carrying conductors receiving power from a supply circuit at the feed end and delivering power at the delivery end, one of said conductors, termed the neutral, being grounded at said feed end and the other conductor, termed the live conductor, being above ground potential, means for protecting said live conductor from current leakage to ground due to a fault creating a conductive path which bypasses said neutral conductor comprising:
   a. a first circuit means establishing a predetermined reference current flow between said conductors;
   b. sensing means responsive to said reference current;
   c. switching means in series with said live conductor operable to be placed in conductive and nonconductive modes;
   d. control means responsive to said sensing means for maintaining said switching means in conductive mode, whereby said conductors may deliver current to a load at said delivery end; and
   e. means responsive to current flow in said live conductor through a path to ground, bypassing said neutral conductor, said last-mentioned means being operable to cancel the response of said control means, placing said switching means in nonconductive mode, thereby disrupting current flow to said delivery end.

2. A power distribution system in accordance with claim 1, including:
   a. a shunt circuit across said switching means; and
   b. means in said shunt circuit operable, upon cessation of current flow, for disabling the operation of said sensing means, whereby said switching means is held in nonconductive mode until current flow ceases through said path to ground.

3. A power distribution system in accordance with claim 1 wherein said first circuit means, establishing a predetermined reference current, includes a resistance between said live conductor in series with a first current coil of a transformer, said current coil being in series with said neutral conductor.

4. A power distribution system in accordance with claim 1 wherein said sensing means comprises the secondary winding of a transformer having a first current coil in series with said neutral conductor.

5. A power distribution system in accordance with claim 1 wherein said switching means comprises a pair of silicon-controlled rectifiers connected back-to-back, in series, with said live conductor.

6. A power distribution system in accordance with claim 1 wherein said control means comprises an oscillator energizing the gate electrodes of said rectifiers.

7. A power distribution system in accordance with claim 1 wherein said means responsive to current flow in said live conductor having a ground path comprises a second current coil of a transformer in series with said live conductor, said transformer having a first current coil in series with said neutral conductor.

8. A power distribution system in accordance with claim 7 wherein said current coils of said transformer are connected in bucking phase relation.

9. In a power distribution system including at least two load current carrying conductors receiving power from a supply circuit at the feed end and delivering power at the delivery end, one of said conductors, termed the neutral, being grounded at said feed end and the other conductor, termed the live conductor, being above ground potential, means for protecting said live conductor from current leakage to ground due to a fault creating a conductive path which bypasses said neutral conductor comprising:
 a. a transformer having a first primary winding in series with said neutral conductor and a second primary winding in series with said live conductor, said primary windings being connected in opposing phase relation;
 b. a secondary winding coupled to said primary windings;
 c. an impedance element connected between said live conductor and said neutral conductor, including, in series, said first primary winding, thereby establishing a predetermined reference current inducing a voltage in said secondary winding;
 d. a circuit breaker for said live conductor having a holding coil; and
 e. circuit means interconnecting said holding coil with said secondary winding, whereby said circuit breaker is held in operating position for maintaining said live conductor in current supplying condition at said feed end until current flow in said second primary winding, due to a path between said line conductor and ground, cancels said induced voltage, thereby effecting the tripping of said circuit breaker.